United States Patent [19]
Whang

[11] Patent Number: 5,418,439
[45] Date of Patent: May 23, 1995

[54] APPARATUS AND METHOD FOR DISCRIMINATING POSITION INFORMATION IN A POSITION CONTROL SYSTEM

[75] Inventor: Chan-Yeong Whang, Osan, Rep. of Korea

[73] Assignee: Samsung Electronics Co., Ltd., Suwon, Rep. of Korea

[21] Appl. No.: 137,748

[22] Filed: Oct. 19, 1993

[30] Foreign Application Priority Data

Oct. 19, 1992 [KR] Rep. of Korea ............... 92-19184

[51] Int. Cl.[6] ........................................... G05B 11/01
[52] U.S. Cl. ................................. 318/560; 318/635; 318/650; 318/569; 318/571
[58] Field of Search ............... 318/560, 635, 650, 569, 318/571

[56] References Cited

U.S. PATENT DOCUMENTS

| | | | |
|---|---|---|---|
| 4,792,737 | 12/1988 | Goff et al. | 318/560 |
| 4,904,911 | 2/1990 | Toyoda et al. | |
| 5,034,672 | 7/1991 | Sakamoto et al. | 318/560 |
| 5,157,317 | 10/1992 | Coby | 318/560 |
| 5,210,476 | 5/1993 | Kazato | 318/560 |
| 5,268,625 | 12/1993 | Plummer | 318/560 |

Primary Examiner—William M. Shoop, Jr.
Assistant Examiner—Karen Masih
Attorney, Agent, or Firm—Burns, Doane, Swecker & Mathis

[57] ABSTRACT

An apparatus and a method for discriminating position information in a position control system. The apparatus includes a position detector for detecting information regarding a current position of a motor, a position counter for counting the motor current position information from the position detector at a fixed period, a central processing unit for reading a counted value from the position counter, comparing the read value with a normal position command value stored therein, compensating for a difference value as a result of the comparison and outputting a position control value based on the compensated value, and a digital/analog converter for converting the position control value from the central processing unit into an analog signal and outputting the analog signal as a position control signal for the motor.

8 Claims, 2 Drawing Sheets

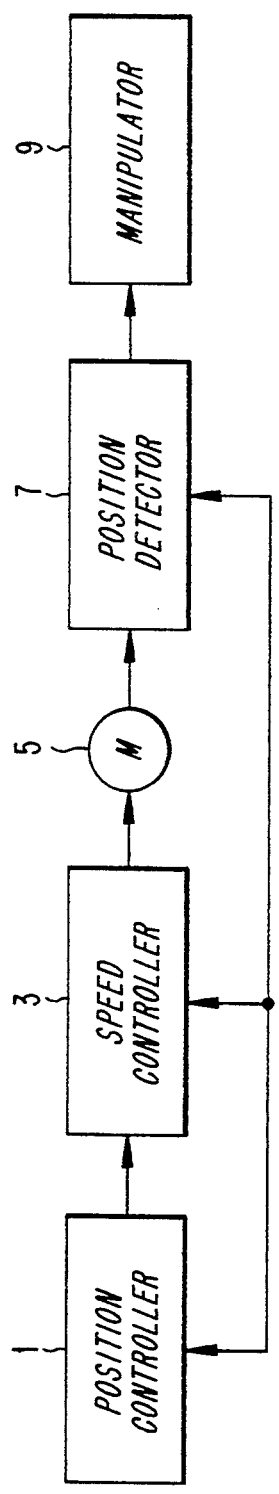
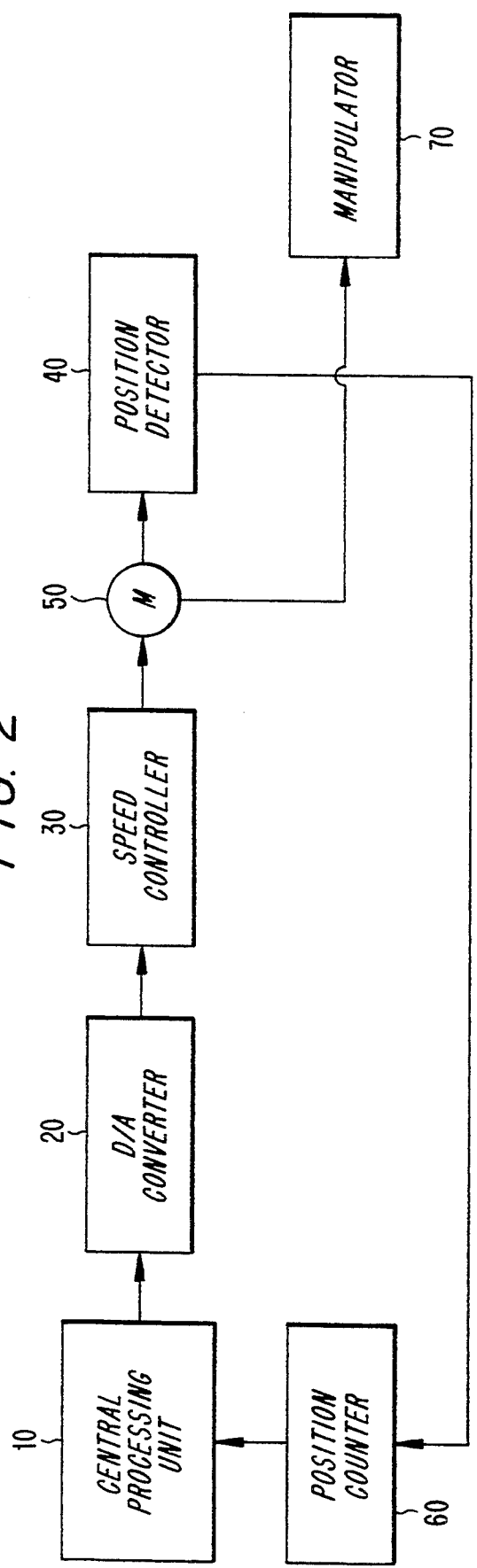

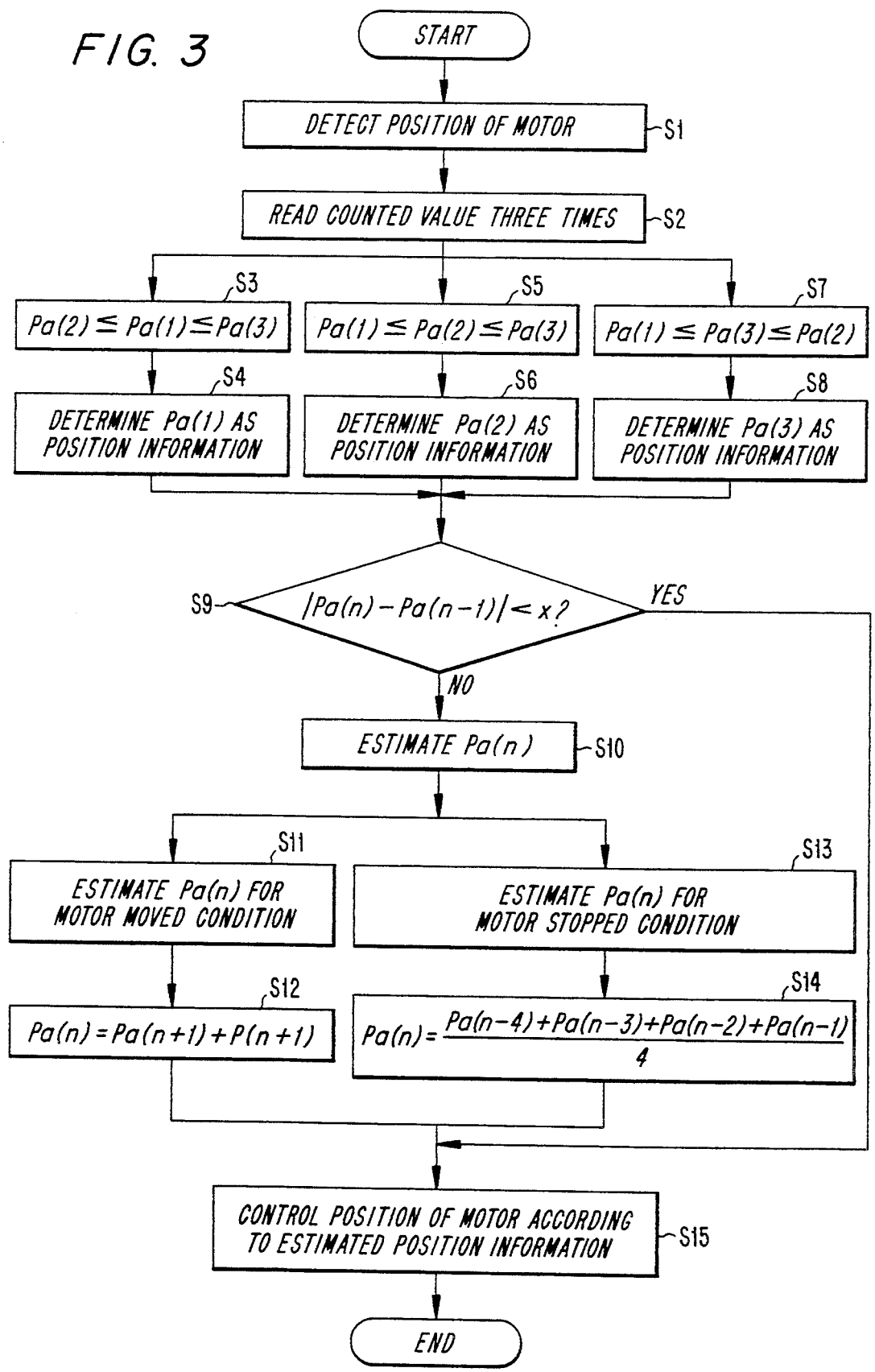

APPARATUS AND METHOD FOR DISCRIMINATING POSITION INFORMATION IN A POSITION CONTROL SYSTEM

BACKGROUND OF THE INVENTION

Field of the Invention

The present invention relates in general to position control systems for robot computerized numerical control machine tools, and more particularly to an apparatus and a method for discriminating position information in a position control system, in which a sensed value from a position detection sensor such as an encoder, a resolver, etc., can accurately be discriminated so that precision in the position control can be enhanced.

Description of the Prior Art

The use of a microprocessor or a micro-controller has recently been increased in industrial machines. According to such a trend, a faulty operation of a system frequently occurs due to a low voltage state of a system power supply, a glitch in a supply voltage from the system power supply or an abrupt variation in a pulse period of the supply voltage, or a malfunction of a central processing unit (CPU).

For this reason, circuitry has been required which is capable of always monitoring the operated states of the power supply and the CPU and coping properly with the faulty operation, for the purpose of securing the reliability of the system. The desired end has been realized up to now by constructing the system in a general-hardware manner. One example of such a hardware system is a position control system which is shown in a block from in FIG. 1, herein.

As shown in FIG. 1, the conventional position control system comprises a position detector 7 for detecting a present position of a motor 5. The position detector 7 may be an encoder or a resolver. A detected value from the position detector 7 is fed back to a position controller 1 and a speed controller 3. As a result, the position and speed controllers 1 and 3 control the position and speed of the motor 5 on the basis of the detected value from the position detector 7.

With this construction, it is discriminated whether the present position of the motor 5 is a desired position. If it is discriminated that the present position of the motor 5 is not the desired position, namely, that a position error is present, position control data is applied to the position and speed controllers 1 and 3 for the control of acceleration and deceleration of the motor 5. The applied position control data is converted into an analog signal and then applied to the motor 5, thereby causing a manipulator 9 for a robot to be actuated. In this case, the position error is compensated for by controlling the motor 5 according to the position control data.

However, the above-mentioned conventional position control system is desirable to make the position control of the motor precise, but has the disadvantage that it is complex in construction and high in cost due to the hardware circuitry. Also, the conventional position control system has a further disadvantage in that the faulty operation thereof frequently takes place under the influence of system internal and external temperatures due to the analog circuitry. This must importantly be considered in view of the precision in the control above all under the current condition that automatization is rapidly propelled.

One example of conventional robot control systems is shown in U.S. Pat. No. 4,904,911. This robot control system comprises an electric motor for driving a shaft executing a Z-axis linear motion of the robot, a servo unit for carrying out a signal supply and a signal feedback to the electric motor, a control portion for supplying a control signal to and receiving a control signal from the servo unit, a threshold value supply portion for supplying a threshold value to the control portion, a comparison portion for comparing a motor torque instruction value with a threshold value supplied from the threshold value supplying portion, an alarm being delivered and the process subsequently proceeding to a step of dealing with an abnormal condition when the motor torque instruction value becomes greater than a predetermined threshold value, whereby the control of the robot is performed based on a detection of a force along the Z-axis of the robot. However, the above-mentioned conventional robot control system has the above problems, too.

SUMMARY OF THE INVENTION

Therefore, the present invention has been made in view of the above problems, and it is an object of the present invention to provide an apparatus and a method for discriminating position information in a position control system, in which a software circuitry is employed to reduce the number of components of the system to the minimum so that the construction can be simplified and the cost can be lowered.

In accordance with one aspect of the present invention, in a position control system having a motor, a speed controller for controlling a speed of said motor and a manipulator being actuated with actuation of said motor, an apparatus is provided for discriminating position information, comprising position detection means for detecting information regarding a current position of said motor; position counting means for counting the motor current position information from said position detection means at a fixed period; control means for reading a counted value from said position counting means, comparing the read value with a normal position command value stored therein, compensating for a difference value as a result of the comparison and outputting a position control value based on the compensated value; and digital/analog conversion means for converting the position control value from said control means into an analog signal and outputting the analog signal to said speed controller.

In accordance with another aspect of the present invention R method is provided of discriminating position information in a position control system, comprising the steps of (a) detecting a current position of a motor, counting the detected value and reading repeatedly the counted value by a predetermined number of times; (b) determining an intermediate one of values obtained by reading the counted value by the predetermined number of times at said step (a) as motor current position information; (c) comparing the motor current position information determined at said step (b) with a predetermined value to check an accuracy of the motor current position information; (d) estimating the motor current position information with respect to moved and stopped conditions of the motor, respectively, if it is checked at said step (c) that the motor current position information is not accurate; and (e) discriminating presence of an error in the position of the motor on the basis of the motor current position information estimated at said step (d) and controlling the motor in accordance with the discriminated result.

BRIEF DESCRIPTION OF THE DRAWINGS

The above and other objects, features and advantages of the present invention will be more clearly understood from the following detailed description taken in conjunction with the accompanying drawings, in which:

FIG. 1 is a block diagram of a conventional position control system;

FIG. 2 is a block diagram of a position control system in accordance with the present invention; and FIG. 3 is a flowchart illustrating a method of discriminating position information in the position control system in FIG. 2 in accordance with the present invention.

DETAILED DESCRIPTION OF THE PREFERRED EMBODIMENT

Referring to FIG. 2, there is shown a block diagram of a position control system in accordance with the present invention. As shown in this drawing, the position control system of the present invention comprises a central processing unit 10 for storing a position information discriminating program therein to prevent generation of an error in discriminating position information. The central processing unit 10 may typically include an arithmetic unit, an input/output unit and etc..

A digital/analog (D/A) converter 20 is provided in the position control system to converter discriminated digital position information from the central processing unit 10 into an analog signal and output the analog signal as a position control system for a motor 50.

A speed controller 30 is also provided in the position control system to output a speed control signal in response to the analog signal from the D/A converter 20 to control the speed of the motor 50.

A position detector 40 is also provided in the position control system to detect information regarding a current position of the motor 50. The position detector 40 may include an encoder or a resolver.

A position counter 60 is also provided in the position control system to count the motor current position information from the position detector 40 at a fixed period and output the counted value to the central processing unit 10.

A manipulator 70 is adapted to be actuated with actuation of the motor 50.

Here, a position information discriminating apparatus of the present invention comprises the position detector 40, the position counter 60, the central processing unit 10 and the D/A converter 20. In the position information discriminating apparatus with this construction, the position counter 60 accurately counts the information regarding the current position of the motor 50 detected by the position detector 40 and outputs the counted value to the central processing unit 10. Therefore, the minimum essential components are used to prevent the generation of an error in the position information discrimination operation of the central processing unit 10, so that the position of the motor 50 can be controlled more precisely.

Referring to FIG. 3, there is shown a flowchart illustrating a method of discriminating the position information in the position control system in FIG. 2 in accordance with the present invention. First, at step S1, the position detector 40 detects the current position of the motor 50, encodes the detected value in the form of binary information and applies the encoded position information to the position counter 60. The position counter 60 counts the position information from the position detector 40 at the fixed period and outputs the counted value to the central processing unit 10.

At step S2, the central processing unit 10 reads repeatedly the counted value from the position counter 60 three times to enhance the precision in the control of the motor 50. In this case, if three values obtained by reading the counted value from the position counter 60 three times are the same, the same value from the position counter 60 is determined as the motor current position information. The determined motor current position information is used as comparison data for discriminating whether the current position of the motor 50 is a desired position. The central processing unit 10 calculates a position control value based on the compared result and applies the calculated position control value to the D/A converter 20. The position control value from the central processing unit 10 is converted into the analog signal by the D/A converter 20 and then applied as the position control signal to the speed controller 30. The speed controller 30 outputs the speed control signal in response to the position control signal from the D/A converter 20. As a result, in response to the speed control signal from the speed controller 30, the motor 50 is driven being maintained at an accurate position.

Also, if two of the three values obtained by reading the counted value from the position counter 60 three times are the same and different from the remaining one, the same value from the position counter 60 is determined as the motor current position information and the above operation is then performed.

On the other hand, if the three values obtained by reading the counted value from the position counter 50 three times are different from one another, the following operation is performed. Namely, the first to third read values Pa(1)–Pa(3) are compared at step S3. If the first read value Pa(1) is an intermediate value as a result of the comparison at step S3, the central processing unit 10 proceeds to step S4 to determine the first read value Pa(1) as the motor current position information.

Also, the first to third read values Pa(1)–Pa(3) are compared at step S5. If the second read value Pa(2) is the intermediate value as a result of the comparison at step S5, the central processing unit 10 proceeds to step S6 to determine the second read value Pa(2) as the motor current position information. Further, the first to third read values Pa(1)–Pa(3) are compared at step S7. If the third read value Pa(3) is the intermediate value as a result of the comparison at step S7, the central processing unit 10 proceeds to step S8 to determine the third read value Pa(3) as the motor current position information.

Then, an accuracy of the motor current position information or the intermediate value (referred to hereinafter as Pa(n) for convenience' sake) is checked at step S9. This step S9 is performed to check whether the motor current position information Pa(n) is within the range of an allowable error X because it may be erroneous information.

The accuracy of the motor current position information Pa(n) is checked at step S9 by subtracting the just previous position information Pa(n-1) from the motor current position information Pa(n), taking an absolute value of the subtracted value and checking whether the absolute value is within the range of the allowable error X, as can be expressed by the following equation (1);

$$|Pa(n)-Pa(n-1)| < X \quad (1)$$

It should be noted that a driving displacement of the motor 50 cannot help being limited due to a performance thereof. For this reason, if the motor current position information Pa(n) does not satisfy the above equation (1), namely, if NO at step S9, the central processing unit 10 recognizes the motor current position information Pa(n) as data read by mistake and then proceeds to step S10 to estimate the motor current position information Pa(n). The estimation of the motor current position information Pa(n) at step S10 is performed with respect to a moved condition of the motor 50 at step S11 and with respect to a stopped condition of the motor 50 at step S13, respectively. The reason for carrying out the estimation of the motor current position information Pa(n) respectively with respect to the moved and stopped conditions of the motor 50 is because the counted values from the position counter 60 are different from each other at the moved and stopped conditions of the motor 50.

The motor current position information Pa(n) is estimated with respect to the moved condition of the motor 50 at step S12, as can be expressed by the following equation (2):

$$Pa(n) = Pa(n-1) + Pg(n-1) \quad (2)$$

where, Pg(n-1) is a t-1th motion command value stored in the central processing unit 10.

Namely, the motor current position information Pa(n) is estimated with respect to the moved condition of the motor 50 by adding the position information just before the current position of the motor 50 to the t-1th motion command value (a normal position value) stored in the central processing unit 10.

Also, the motor current position information Pa(n) is estimated with respect to the stopped condition of the motor 50 at step S14, as can e expressed by the following equation (3):

$$Pa(n) = \{Pa(n-4) + Pa(n-3) + Pa(n-2) + Pa(n-1)\}/4 \quad (3)$$

Namely, the motor current position information Pa(n) is estimated with respect to the stopped condition of the motor 50 by summing position information corresponding to four rotations of the motor 50 just before the current position of the motor 50 and dividing the summed value by 4 (the number of rotations).

In this manner, the motor current position information Pa(n) is relatively accurately estimated with respect to the moved condition of the motor 50 by adding the position information Pa(n-1) just before the current position of the motor 50 to the t-1th motion command value stored in the central processing unit 10, since the position information from the position counter 60 is constant for a fixed sampling period although the motor 50 is in motion.

Noticeably, an error in the position of the motor 50 generally occurs only when the position of the motor 50 is beyond the range of the allowable error. In this case, the central processing unit 10 determines a compensation value for the position of the motor 50 and then corrects accurately the position of the motor 50 based on the determined compensation value. The above-mentioned method is to employ this rule.

Then, at step S15, the central processing unit 10 compares the estimated motor current position information Pa(n) regarding the moved or stopped condition of the motor 50 with a motion command value of the same order of rotations stored therein and outputs the position control value in accordance with the compared result to control the motor 50.

On the other hand, if the motor current position information Pa(n) satisfies the above equation (1), namely, if YES at step S9, the central processing unit 10 recognizes the motor current position information Pa(n) as accurately read data and then proceeds to step S15.

As apparent from the above description, according to the present invention, the position control system is constructed by the use of software breaking from the conventional hardware configuration. Therefore, the construction of the system can be simplified and the cost can be lowered. Also, the position control is performed in the software to enhance the precision. This has the effect of increasing the productivity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. In a position control system having a motor, a speed controller for controlling a speed of said motor and a manipulator being actuated with actuation of said motor, an apparatus for discriminating position information, comprising:

position detection means for detecting information regarding a current position of said motor;

position counting means for counting the motor current position information from said position detection means at a fixed period;

control means for reading a counted value from said position counting means, comparing the read value with a reference position command value stored therein, compensating for a difference value as a result of the comparison by estimating the motor current position information with respect to moved and stopped conditions of the motor and outputting a position control value based on the estimated motor current position information; and digital/analog conversion means for converting the position control value from said control means into an analog signal and outputting the analog signal to said speed controller.

2. A method of discriminating position information in a position control system, comprising the steps of:

(a) detecting a current position of a motor and encoding the detected position as a value, counting the detected value and reading the counted value a predetermined number of times;

(b) setting motor current position information to a value based on the values obtained by reading the counted value the predetermined number of times at said step of detecting;

(c) comparing the motor current position information determined at said step of setting with a predetermined value to determine whether the motor current position information is equal to the predetermined value;

(d) estimating the motor current position information with respect to moved and stopped conditions of the motor, respectively, if it is determined at said step of comparing that the motor current position is not equal to the predetermined value; and (e) discriminating whether an error has occurred in the current position of the motor on the basis of the motor current position information estimated at said step of estimating and controlling the motor by a compensated motor position value in accordance with the discriminated result.

3. A method of discriminating position information in a position control system, as set forth in claim 2, wherein said step of setting comprises the step of:

setting the motor current position information to the counted value directly if the values obtained by reading the counted value the predetermined number of times at said step of detecting are equal to one another.

4. A method of discriminating position information in a position control system, as set forth in claim 2, wherein said step of estimating comprises the step of:

estimating the motor current position information with respect to the moved condition of the motor by adding position information just before the current position of the motor to a reference motion command value.

5. A method of discriminating position information in a position control system, as set forth in claim 2, wherein said step of estimating comprises the step of:

estimating the motor current position information with respect to the stopped condition of the motor by summing position information corresponding to a predetermined number of rotations of the motor just before the current position of the motor and dividing the summed value by the predetermined number of rotations.

6. A method of discriminating position information in a position control system, as set forth in claim 2, wherein said step of setting comprises the step of:

setting the motor current position information to an intermediate value of said values obtained by reading the counted value the predetermined number of times at said step of detecting if said values are different from one another.

7. A method of discriminating position information in a position control system, as set forth in claim 2, wherein said predetermined number of times is three and said step of setting comprises the step of:

if two out of the three values obtained by reading the counted value at said step of detecting are equal to one another, setting the motor current position information to a value equal to the two values.

8. An apparatus for discriminating position information for a position control system having a motor, a speed controller for controlling speed of the motor and a manipulator being actuated with actuation of the motor, comprising:

position detection means for detecting information regarding a current position of the motor;

position counting means for counting the current position information obtained from said position detection means at a fixed interval and outputting a count value;

control means for storing a reference position command value and for comparing the count value with the reference position command value to output a difference value, determining a compensated value of the current position information based on the difference value by estimating the motor current position information with respect to moved and stopped conditions of the motor and outputting a position control value based on the estimated position of the current motor; and conversion means for converting the position control value from said control means into an analog signal and outputting the analog signal to said speed controller.

* * * * *